US012657531B2

(12) United States Patent
Acuna Agost et al.

(10) Patent No.: US 12,657,531 B2
(45) Date of Patent: Jun. 16, 2026

(54) ESTIMATING RESOURCE REQUIREMENTS

(71) Applicant: AMADEUS S.A.S., Biot (FR)

(72) Inventors: Rodrigo Acuna Agost, Golfe Juan-Vallauris (FR); Eoin Thomas, Antibes (FR); Jorge De Antonio Del Pecho, Madrid (ES); Angel Lorente Paramo, Madrid (ES); Raquel Martinez Avellana, Madrid (ES); Diego Heredia Motas, Madrid (ES)

(73) Assignee: Amadeus S.A.S., Biot (FR)

( * ) Notice: Subject to any disclaimer, the term of this patent is extended or adjusted under 35 U.S.C. 154(b) by 187 days.

(21) Appl. No.: 18/422,249

(22) Filed: Jan. 25, 2024

(65) Prior Publication Data

US 2024/0256995 A1 Aug. 1, 2024

(30) Foreign Application Priority Data

Feb. 1, 2023 (EP) .................................... 23315019

(51) Int. Cl.
*G06Q 10/0631* (2023.01)
*G06N 20/00* (2019.01)

(52) U.S. Cl.
CPC ......... *G06Q 10/0631* (2013.01); *G06N 20/00* (2019.01)

(58) Field of Classification Search
CPC .......................... G06Q 10/0631; G06Q 10/04
See application file for complete search history.

(56) References Cited

U.S. PATENT DOCUMENTS

| | | | |
|---|---|---|---|
| 9,710,838 B2 * | 7/2017 | Sahawneh | ........ G05B 19/41865 |
| 10,937,089 B2 * | 3/2021 | Nandan | ................. G06N 20/00 |
| 2008/0168462 A1 * | 7/2008 | Li | ........................... G06N 20/00 |
| | | | 718/104 |

(Continued)

FOREIGN PATENT DOCUMENTS

| | | | |
|---|---|---|---|
| EP | 3576029 A1 | 4/2019 | |
| WO | WO-2020037055 A1 * | 2/2020 | ........... G05B 13/027 |

OTHER PUBLICATIONS

Ryu Unsok, et al.: "A Clustering Based Traffic Flow Prediction Method with Dynamic Spatiotemporal Correlation Analysis", Transportation, Springer US., New York, vol. 49, No. 3, Jun. 13, 2021, pp. 951-988.

(Continued)

*Primary Examiner* — Dylan C White
(74) *Attorney, Agent, or Firm* — PERRY + CURRIER INC.

(57) ABSTRACT
A computerized method of estimating resource requirements in an environment is presented. The method comprises a preparation phase and a simulation phase, wherein the preparation phase comprises a machine learning training phase and a clustering phase. The machine learning training phase trains a machine learning model to predict a resource requirement. Thereby, a subset of features is extracted. The clustering phase determines clusters in the subset of features, a correlation coefficient and least one identifying parameter of a distribution of the feature values of the subset of features. Finally, the simulation phase determines a distribution for a feature, selects at least one value for a feature and uses the second machine learning model to estimate a resource requirement in the environment in at least one time period the future.

18 Claims, 5 Drawing Sheets

(56) References Cited

U.S. PATENT DOCUMENTS

| | | | |
|---|---|---|---|
| 2019/0180358 A1* | 6/2019 | Nandan | G06F 18/2113 |
| 2019/0370914 A1* | 12/2019 | Anagnostos | G05B 15/02 |
| 2023/0091610 A1* | 3/2023 | Tamazlykar | G06N 3/08 |
| | | | 706/11 |
| 2024/0232705 A9* | 7/2024 | Johnsson | G06N 20/00 |

OTHER PUBLICATIONS

Mailed Jul. 6, 2023, Extended European Search Report, issued in corresponding EP Application No. 23315019.2, Filed Feb. 1, 2023.

* cited by examiner

120

625

626

627

724

725

726

Samples

ESTIMATING RESOURCE REQUIREMENTS

FIELD

The present disclosure generally relates to controlling resource requirements and, in particular, to estimating resource requirements in an environment.

BACKGROUND

Resources are limited and the provision of resources is a crucial task enabling an environment to work properly. The estimation of resource requirements and controlling the provision of the resources is difficult. If it is a matter of steady-state systems, in which no or only minor external influences are to be expected and/or in which the resource requirement shows a known development, there already exist practicable approaches in the state of the art. However, if unforeseen circumstances have disturbed a well-known system, so that the previous predictions are useless, new approaches are required to optimize resource allocations in environments. This means that not too much, but also not too few, resources are provided if needed.

In the past, machine learning routine have been shown to be effective for estimating future time series values in some circumstances. Although machine learning is promising for short time predictions, predictions in farther future may not be accurate. Moreover, unforeseen circumstances cannot be predicted by machine learning methods without further interventions. Finally, when predicting resource requirements, uncertainty of the prediction has to be considered as well.

Therefore, the present disclosure presents methods and systems for estimating resource requirements tackling the above-mentioned problems.

SUMMARY

In this context, methods, systems and computer program products are presented as defined by the independent claims.

More specifically, a computerized method of estimating resource requirements in an environment is presented. The method comprises a preparation phase and a simulation phase, wherein the preparation phase comprises a machine learning training phase and a clustering phase. The machine learning training phase comprises receiving historical environment data from a plurality of distributed first databases, wherein the historical environment data comprises historical values of a time series for a plurality of features reflecting characteristics of the environment, receiving historical resource requirement data from at least one second database, wherein the historical resource requirement data comprises historical values relating to a resource requirement, and training a machine learning model to predict a resource requirement of the environment, wherein during the training phase a subset of features from the plurality of features is extracted. The clustering phase comprises determining at least two clusters in the historical environment data, wherein a cluster represents time periods having correlated values for features in the subset of features, determining, for a cluster, a correlation coefficient of the features in the subset of features, and determining, for a cluster, at least one identifying parameter of a distribution of the feature values of the subset of features. The simulation phase for a cluster comprises determining a distribution for a feature of the subset of features according to the correlation coefficient and the at least one identifying parameter for the cluster, selecting at least one value for the feature of the subset of features based on the determined distributions, and inputting the at least one value for the feature of the subset of features to the machine learning model to estimate a resource requirement in the environment in at least one time period the future.

Yet another aspect concerns a system of estimating resource requirements in an environment that is configured to execute the methods described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the disclosure not being limited to any particular embodiments.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements, in which.

DETAILED DESCRIPTION

The present disclosure relates to methods and systems of estimating a resource requirement for controlling resources in the future. Generally, it is crucial in many areas to estimate resource requirements in the future so that enough but not too much resources can be supplied. A goal is then to find a good balance between complexity of the models or simulations that estimate the required resources and the accuracy of the estimation. Low complexity predictions are easier to implement, require less features and provide less sources of errors. However, such low complexity predictions lead to a higher error and reduced confidence. Higher complexity may lead to a lower error and a higher confidence and, thus, provide better estimations.

Complexity may depend on different factors, e.g., time granularity, geo granularity, number of variables to be considered, number of data sources used, type of model that is used for simulation, or the quantity of data. For example, time granularity refers to whether years, quarters, months, days, hours, hours, minutes, seconds, or milliseconds. Additionally or alternatively, finer or larger time scales may be considered. Geo granularity refers to the environmental regions that are considered, e.g., the whole world, a plurality of regions, of countries, of cities, one or more networks in a city, and the like. Models can be linear or more complex, and the quantity of data used depends on how much historical data is considered.

When estimating a resource requirement in the future, it may also be relevant to generate plausible future scenarios and not only to provide an estimation for one single scenario. For example, if required power or gas resources are to be estimated, it is not only relevant to provide only one possible resource requirement but consider different scenarios, e.g., cold and warm winter seasons and possibly with further unforeseen circumstances, such as wars, social unrest, pandemics, and the like.

The present disclosure provides a tool for estimating resource requirements that uses machine learning for prediction but reduces the required resources and complexity by clustering the relevant data for determining plausible scenarios. These components are combined in a simulation tool that is able to reliably estimate different future resource requirements while keeping the complexity low.

Figure 1:
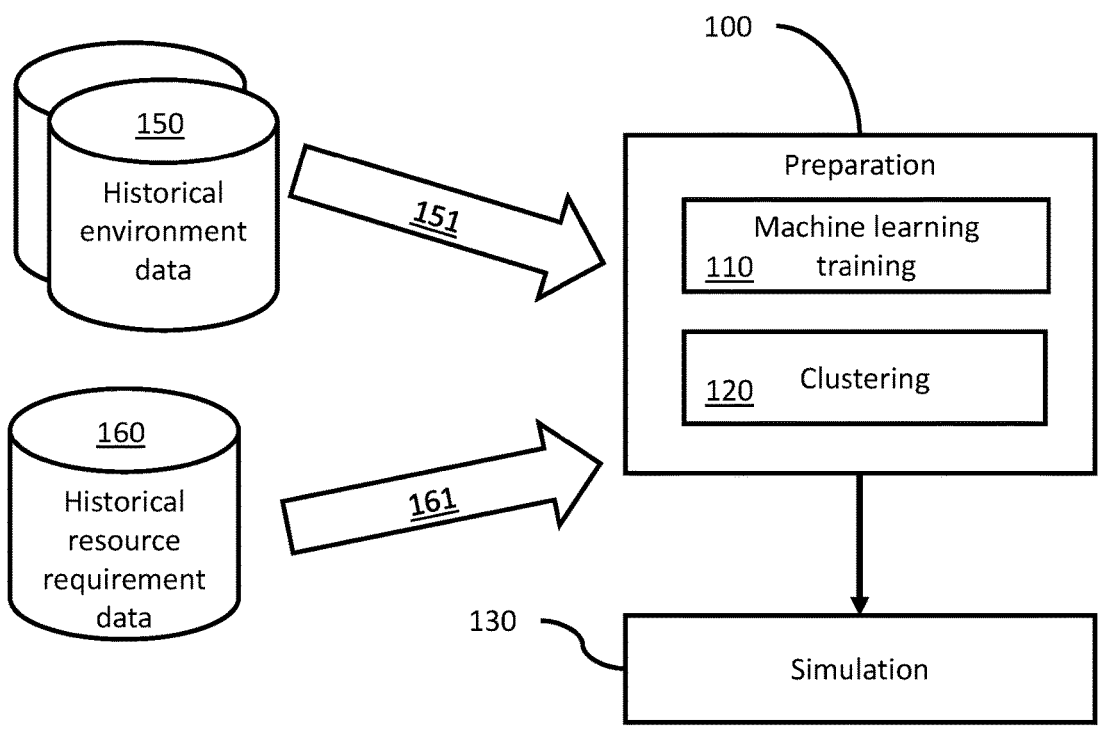
FIG. 1 presents an overview on the components for estimating resource requirements as described herein.

FIG. 1 presents an overview on the components for estimating resource requirements in an environment at a high level. The environment may be any environment that requires resources, such as a flight resources environment on a global, regional, or country level that requires the provision of flights, an electric power, gas, water etc. supply environment on a country, district, or city level that requires the provision of power, gas water, etc., a mobile communication network environment that requires the provision of data transmission resources, or the like. The considered environment may a part of a superordinate environment and the methods described herein may be executed for any part of the superordinate environment separately.

The system of estimation resource requirements according to the disclosure comprises a preparation component 100 that implements a preparation phase and a simulation component 130 that implements a simulation phase. The preparation component 100 comprises two sub-components, namely, a machine learning training component 110 and a clustering component 120. The machine learning training component 110 implements a machine learning training phase and the clustering component 120 implements a clustering phase of the methods described herein. The preparation component 100 receives historical environment data 151 from one or more historical environment databases 150. The preparation component 100 also receives historical resource requirement data 161 from a historical resource requirement database 160. The historical resource requirement data 161 and the historical environment data 151 may also be provided by a single database (not shown).

The described components may be implemented on a computing system. The computing system may be a single computer or server but may also be implemented on a plurality of interconnected servers or computers. The computing system may include a processor, a memory, a mass storage memory device, an input/output (I/O) interface, and a Human Ma-chine Interface (HMI). The computing system may also be operatively coupled to one or more external resources via a network or I/O interface. External resources may include, but are not limited to, servers, databases, such as the databases 150 and 160, mass storage devices, peripheral devices, cloud-based network services, or any other suitable computer resource that may be used by the computing system. The network may be a wide area network, global network, the Internet, or similar network, may be a public or a private network, and/or may include multiple interconnected networks as known by the skilled person.

The historical environment data 151 received from a plurality of distributed first databases, e.g., the historical environment databases 150 comprises historical values of a time series for a plurality of features reflecting characteristics of the environment. These historical environmental features may be macro-economic parameters such as population, unemployment rate, household savings, fuel price, economic activity, Gross Domestic Product, power mix structure, gas imports, and the like. Additionally or alternatively, there may be features relating to technical factors of the environment, e.g., of a mobile communication network, such as age of base stations or of use mobile devices, implemented mobile communication standard (LTE, 5G etc.), data usage in the network, and the like. The historical environmental features may be features of a specified time period in the past, e.g., yearly values of the last three, four, five, or even more years. This means that there may be hundreds or thousands of values provided to the preparation component 100.

The historical resource requirement data 161 received from a second database, e.g., the historical resource requirement databases 160 comprises historical values relating to a resource requirement. For example, the historical values relating to the resource requirement are the number of flights provided or the number of passengers using flights in the region of Europe in the last three, four, five, or even more years on a yearly basis. In another example, the historical values relating to the resource requirement are data transfer rates in the mobile communication network of France in the last six months on a monthly basis. In yet another example, the historical values relating to the resource requirement correspond to used electric power in KWh/person of a city on a weekly basis for the last three years, i.e., about 160 values.

The historical environment data 151 may be preprocessed before the preparation component 100 receives the data. Preprocessing may comprise at least one of cleaning of data, e.g., removing some values/parameters, aggregation of data, e.g., aggregating values of parameters, flattening or scaling, e.g., normalizing the data, and interpolation of data. Additionally or alternatively, the historical resource requirement data 161 may be preprocessed before the preparation component 100 receives the data. Preprocessing may then comprise at least one of cleaning, aggregation, merging, and interpolation of data.

The historical resource requirement data 161 and the historical environment data 151 are used by the machine learning training component 110 in the machine learning training phase to train a machine learning model to predict a resource requirement based on the subset of parameters. In the machine learning training phase also a subset of parameters from the plurality of parameters of the historical environment data 151 is extracted. The machine learning training phase, thus, has two targets: Selecting a subset of parameters and training a machine learning network. Selecting a subset of parameters relates to feature selection or feature extraction as known in the art. It aims at extracting the most relevant features for reliably predicting the resource requirement with a machine learning model Training the machine learning model is subsequently based on the selected features, i.e., subset of parameters.

The historical environment data 151 and the historical resource requirement data 161 may in some embodiments be periodically updated with newer data. In such embodiments, the machine learning model may be periodically retrained using the updated historical environment data and updated historical resource requirement data. The periods of data updating and of the machine learning model retraining may be the same but may also be different.

The historical environment data 151 is also used indirectly by the clustering component 120 for finding clusters in the historical environment data. A cluster represents time periods having correlated values of features in the subset of features. This can be achieved by an unsupervised machine learning algorithm such as a k-means clustering. Each cluster has in its features a reduced variance and plausible combination of features. The clusters are multi-dimensional with each feature being a dimension. For determining the optimal number of clusters, different approaches can be used, e.g., elbow curve method or silhouette analysis as known in the art.

The simulation phase implemented at the simulation component 130 finally provides users, e.g., via a user interface, with different estimations of the resource requirement in the environment in at least one time period in the future. Additionally or alternatively, resources may be automatically provided in the future based on the different estimations of the resource requirement in the environment, e.g., by selecting the most likely estimation or by selecting the estimation that leads to the highest resource requirement or by using of quantiles, such as 90%, 85% 80% or the like, for controlling a level or risk.

When the considered environment is part of a superordinate environment, the plurality of distributed first databases, i.e., the historical environment databases 150 may further comprise other historical environment data for other parts of the superordinate environment. Other parts refer to other environments, such as for example other regions on the world. In such an embodiment, the at least one second database, i.e., historical resource requirement databases 160 may comprise other historical resource requirement data for the other parts of the superordinate environment. As a result, the machine learning training phase implemented at the machine learning training component 110 may train other machine learning model(s) for the other part(s) of the superordinate environment. Additionally, the clustering phase is also executed for the other environments that are comprised by the superordinate environment. The simulation phase may then be focused on only one of these parts or on all. In the latter example, a user may select the environment to be simulated via a user interface or an application automatically selects one or more environments to be simulated.

Figure 2:
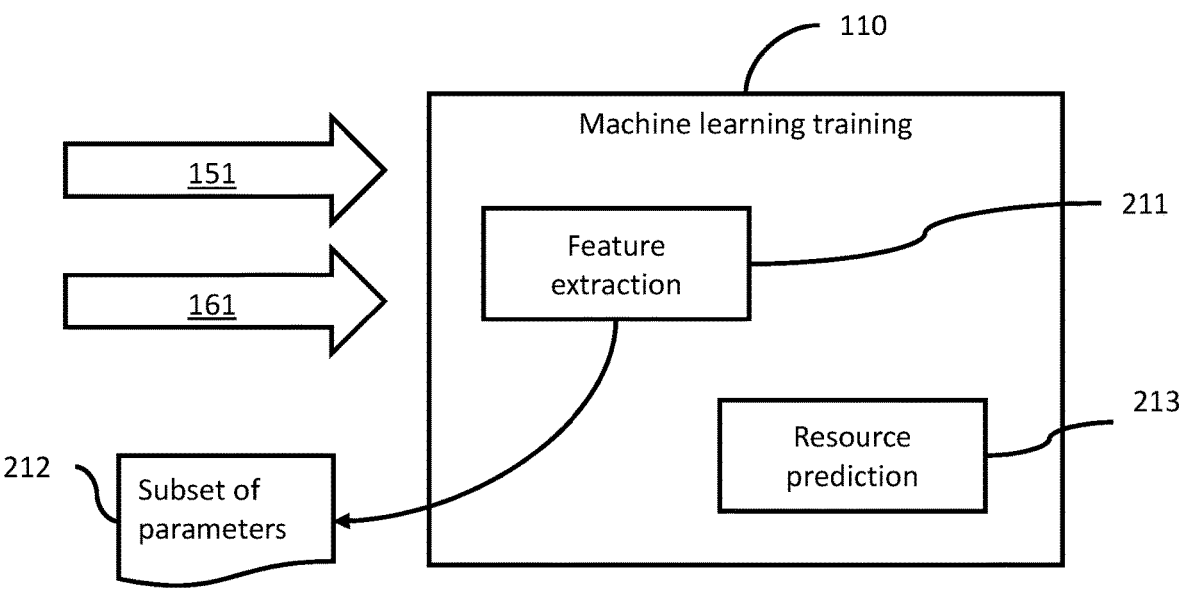
FIG. 2 details a machine learning training phase according to the disclosure.

FIG. 2 details the machine learning training phase. As explained above, the machine learning training phase implemented in the machine learning training component 110 selects a subset of features 212, i.e., performs feature extraction 211 when training a machine learning network for resource prediction 213. The machine learning training phase receives the historical environment data 151 and the historical resource requirement data 161 as explained above.

Feature selection generally refers to techniques that select a subset of the most relevant features for a dataset. Fewer features can allow machine learning algorithms to run more efficiently, i.e., less memory consuming and/or with a lower time complexity. Moreover, the reliability of the prediction is also improved since some machine learning algorithms can be misled by irrelevant input features, resulting in worse predictive performance. Moreover, this also avoids the so-call overfitting of the machine learning model. The stages of the machine learning training phase can be implemented differently.

In an example, a machine learning network comprising a feature extractor part 211 and a predictor part 213 is trained. Such a machine learning network may be composed, e.g., of a convolutional neural network (CNN) with a plurality of layers for feature extraction and a predictive neural network, e.g., a multi-layer perceptron or a recurrent neural network with a one or more layers for estimating the resource requirement.

The feature extractor 211, i.e., the convolutional neural network consists of an input layer, hidden layers and an output layer. The hidden layers include layers that perform convolutions, which may include a layer that performs a dot product of the convolution kernel with the layer's input matrix. As the convolution kernel slides along the input matrix for the layer, the convolution operation generates a feature map, which in turn contributes to the input of the next layer. This is followed by other layers such as pooling layers, fully connected layers, and normalization layers. CNNs are known to extract features, i.e., in the present disclosure, the CNN is trained to extract the subset of features from the time series for environmental features.

In alternative implementations the machine learning network may rely on tree-based machine learning approaches, such as random forest or the like.

Additionally, the predictive network 213 is trained to predict the future resource requirement from the time series for a plurality of features of the subset of features. The predictive network 213 can actually be any network that is capable of predicting the future of a (multi-variate) time series, e.g., linear regression, logistic regression, classification and regression trees, naive Bayes network, k-nearest neighbors (KNN), k-learning vector quantization, support vector machines, random forest, gradient boosting trees, and the like.

In another example, the feature extraction 211 can be implemented by the recursive feature extraction (RFE) algorithm as known in the art. RFE is easy to configure and to use. RFE is effective at selecting those features in a training dataset that are more or most relevant in predicting the target variable. The goal of RFE is to select features by recursively considering smaller and smaller sets of features. This is achieved by continuously training the predictive machine learning network 213. As in the previous example, this predictive machine learning network 213, or also referred to as estimation network or estimator, may be any network that is capable of predicting the future of a (multi-variate) time series, e.g., linear regression, logistic regression, classification and regression trees, naive Bayes network, k-nearest neighbors (KNN), k-learning vector quantization, support vector machines, random forest, gradient boosting trees, and the like. In an embodiment, the estimator is an elasticNet algorithm that combines a linear regression combined with L1 and L2 priors as regularizer.

First, the estimator is trained on the initial set of features, i.e., features from the historical environment data 151, and the importance of each feature is obtained. Then, the least important features are pruned from current set of features. That procedure is recursively repeated on the pruned set until a threshold is reached, e.g., a desired number of features, a maximum number of iterations, an error threshold, or the like. Finally, the estimator can be efficiently further trained with the extracted features from the initial set of features.

There are two configuration options when using RFE: the choice in the number of features to select and the choice of the algorithm used to help choose features. Both of these hyperparameters can be explored, although the performance of the method is not strongly dependent on these hyperparameters being configured well.

Figure 3:
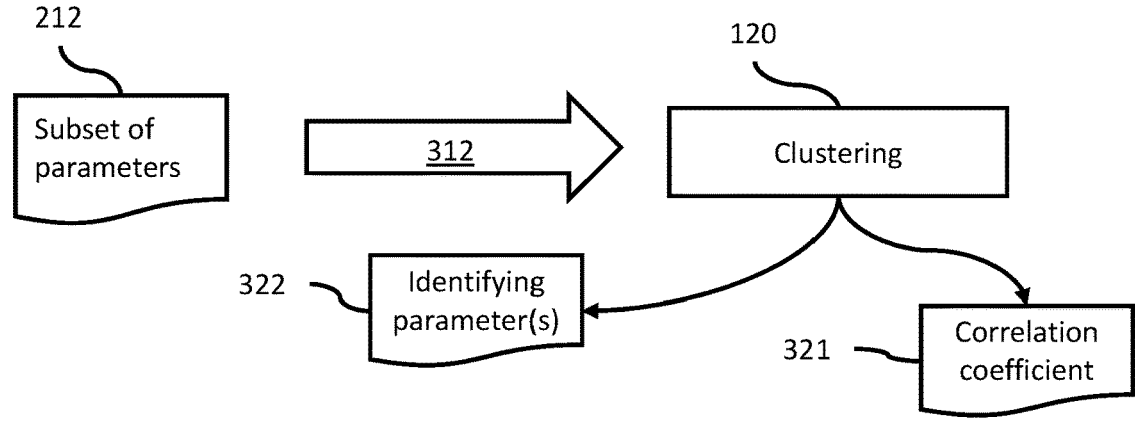
FIG. 3 details a clustering phase according to the disclosure.

FIG. 3 further details the clustering phase. The subset of features 212 as determined by the machine learning training phase may be stored and are further received in arrow 312 by the clustering component 120. The clustering phase implemented in the clustering component 120 determines clusters in the subset of features 212. A cluster represents time periods having correlated values of features. An unsupervised machine learning algorithm such as a k-means clustering may be used to determine the clusters. Each cluster has in its features a reduced variance and plausible combination of features.

The clustering phase determines a correlation coefficient 321 of the features of the subset of features 212. In some embodiments, a correlation coefficient 321 is determined for each pair of features in the subset of features 212 that are correlated. Moreover, for the values of at least one feature in the subset of features 212 at least one identifying parameter 322 of a probability distribution reflecting the feature values in the cluster is determined. Identifying parameters 322 are, e.g., a mean and a variance of a normal distribution or a log-normal distribution, a location and scale for a Cauchy or logistic distribution, or the like. For determining the identifying parameters 322, different approaches can be used, such as the method of moments, maximum spacing estimation, method of L-moments, maximum likelihood method or the like.

In an example, when considering macro-economic parameters such as population, unemployment rate, household savings, fuel price, economic activity, Gross Domestic Product (GDP), power mix structure, gas imports, and the like, it may have been determined by the machine learning training phase that—for predicting the future flight resources requirement in the region (i.e., environment) of Europe—the GDP and the household savings are the most relevant features, i.e., the time series of these features of the last five, ten, or even more years are considered. Moreover, it may then be determined that these features are correlated, e.g., by determining a correlation factor of 0.7. Determining a correlation factor can be achieved with any method known in the art that is suitable for the purpose. Then, clusters in these features are determined. These clusters then reflect, e.g., years of growth, years of recession, and years of constant economy. For each of these clusters, a distribution is determined that reflects the distribution of one of the features, e.g., a normal distribution. With feature fitting, the identifying parameters of this distribution are determined, e.g., a mean and a variance.

Figure 4:
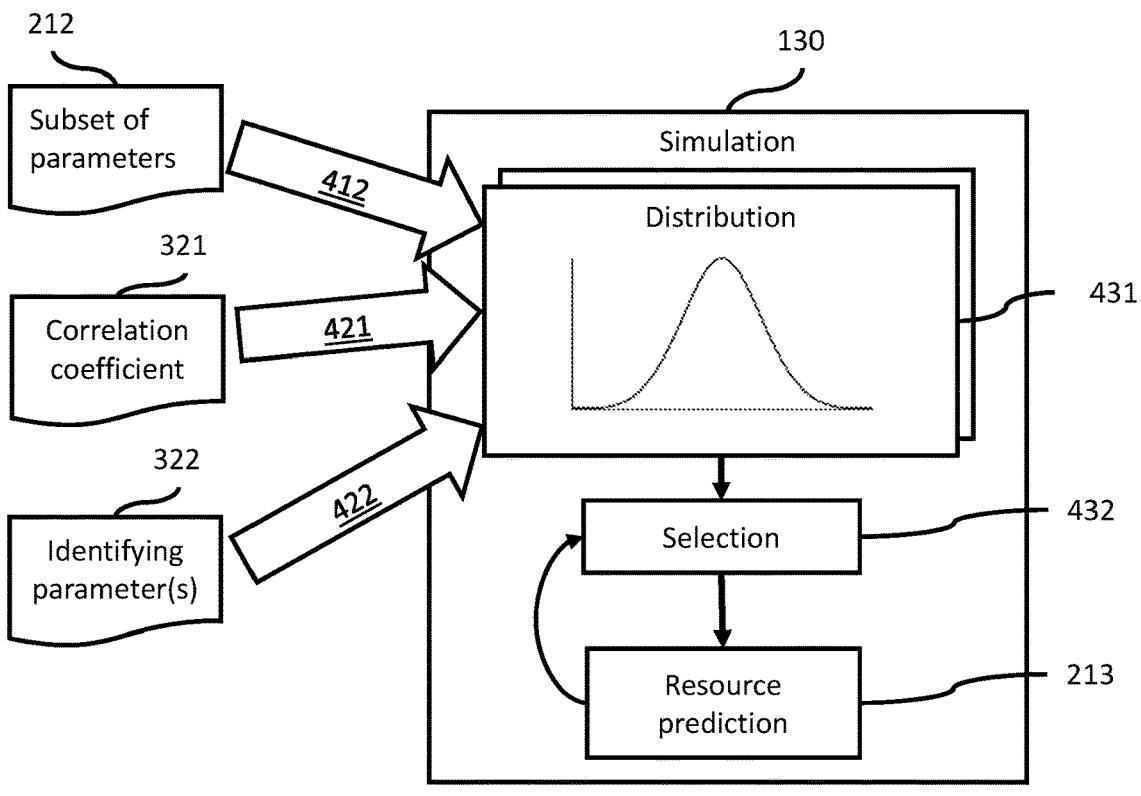
FIG. 4 details a simulation phase according to the disclosure.

FIG. 4 further details the simulation phase implemented in the simulation component 130. The simulation phase first determines a probability distribution 431 for at least one feature of the subset of features 212 according to the correlation coefficient 321 and the at least one identifying parameter 322 for the cluster. Therefore, the subset of features 212, the correlation coefficient 321, and the at least one identifying parameter 322 for each cluster are provided to the simulation component 130 as depicted with arrows 412, 421, and 422. For example, the subset of features is used to determine for which features, e.g., GDP and household savings, a distribution 431 has to be determined. Then, it is determined which cluster is to be simulated, e.g., a recession year. Accordingly, the identifying parameters 322 of the determined cluster are selected and one or more distributions 431 are determined.

For example, if the subset of features comprises the GDP and the household savings, if the correlation coefficient of these two is 0.9, and if the cluster of the recession year in the environment of Europe was determined to have a mean of 6 (meaning 6 trillion € GDP) and a variance of 2, a normal distribution with mean 6 trillion € and variance of 2 trillion will be assumed for the GDP. Similarly, a normal distribution with mean of 10% household saving rate and variance of 5 may be assumed for the household savings.

When having determined the distribution(s) 431, the simulation phase proceeds, selecting at least one value for each feature of the subset of features based on the determined distributions as depicted in box 432. For example, the value is drawn randomly from the distribution 431, such as a GDP of 5.5 trillion €. The value of the household savings may be drawn similarly and result in a 11%. Alternatively, the value for another feature such as the household savings may be determined also based on the correlation coefficient. If in such an example, the GDP is randomly drawn and determined to be 5.5, the household savings that were determined to be highly correlated are set to 9% (i.e., also less than the mean) to reflect the correlation of these two features.

Figure 7:
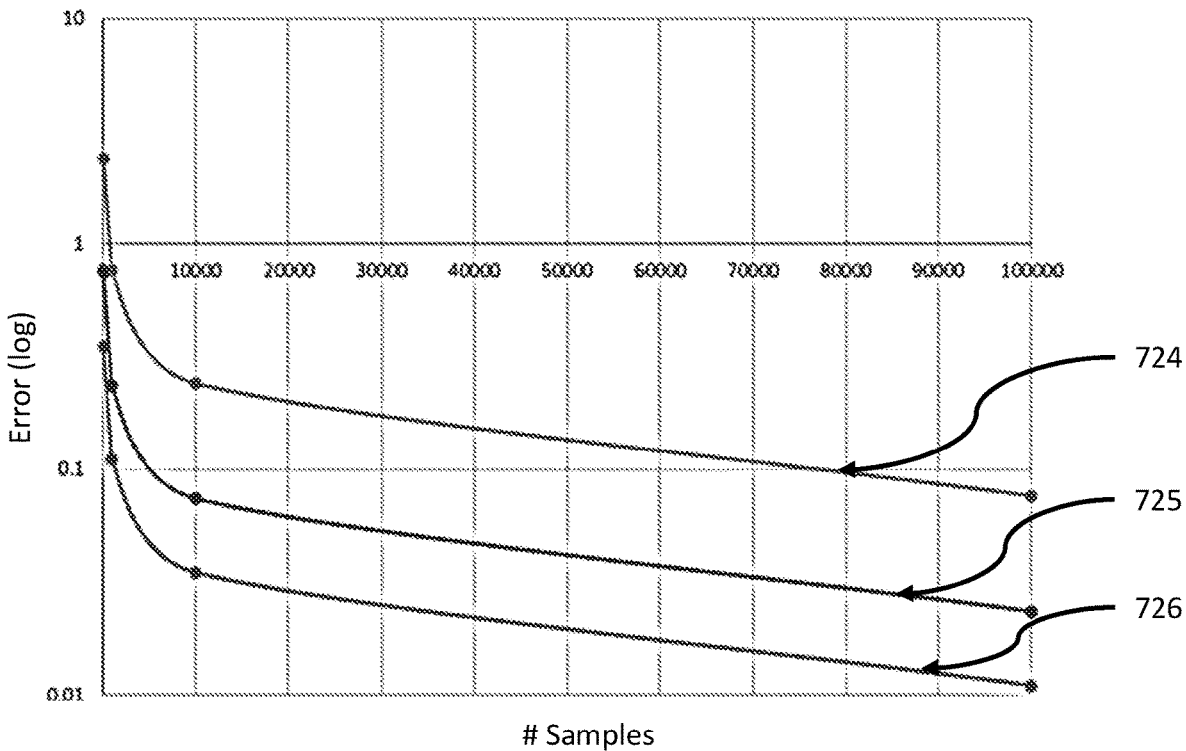
FIG. 7 depicts the reduction of required samples when using clusters of features.

Finally, when all required feature values of the subset of features have been determined, the values are inputted to the trained machine learning model to estimate a resource requirement in the environment in at least one time period the future. For example, the GDP of 5.5 and the household savings of 11 are feed into the machine learning prediction model 213, which then estimates the required number of flights starting and/or landing in Europe for the next year when the GDP and the household savings would have these values. Selecting values as explained above for box 432 may be repeated until a stopping condition is reached, e.g., until the mean value of the estimation converges to a reliable value and its variance is stable. With the clustering idea, this process requires less calculations as these conditions are reached faster (estimation converge faster to a value with low error, as shown in FIG. 7).

In some embodiments, selection of values may be performed for a plurality of successive time periods, e.g., for the next five years. This means that for each year a value for each feature of the subset of features is selected and then all these values are fed into the resource prediction model 213. When considering a plurality to future time periods as input, the estimation of resource requirements can also be extended to a plurality of time periods. Moreover, the selected values may not be the only input to the estimator 213 but also historical resource requirement data 151 may be used as input, thereby building a longer time series as input for the estimator 151.

Figure 5:
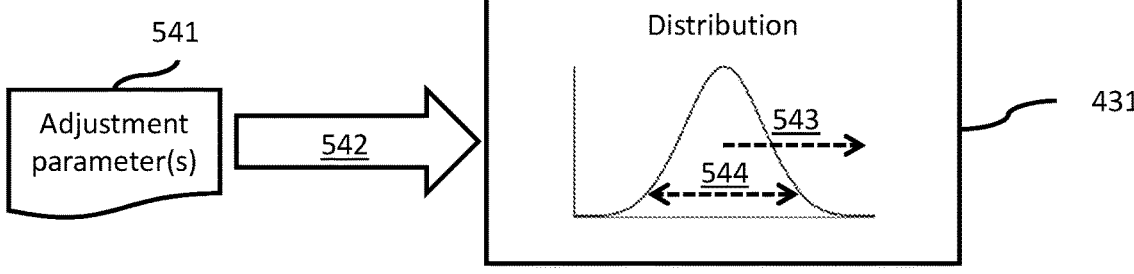
FIG. 5 presents an example of adjusting a distribution used in the simulation phase.

As already stated above, unforeseen circumstances can reduce the reliability of the resource estimation. Therefore, the present disclosure presents the possibility to add adjustment parameters 541 to the simulation phase as shown in FIG. 5. At least some of the adjustment parameters 541 are considered when determining the distribution 431 of the parameters as shown with arrow 542. The adjustment parameters 541 reflect an unusual or unforeseeable development of the environment that also has an impact on the features of the subset of features 212. The unusual development of the environment may be at least one of a future war, a future social unrest, a future technical development, a future pandemic, a future nature event, and a future recovery of a past sharp drop in the resource requirement.

The adjustment parameters 541 may be provided, e.g., by an expert, through a user interface or may be determined by a model of unusual development(s) of the environment. This model may be a machine learning model trained on historical data, e.g., on wars, pandemics, or the like. The adjustment parameters 541 may, e.g., lead to a shift of the mean of the distribution as shown with arrow 543, modify the variance of the normal distribution as shown with arrow 544, or make other modifications to the distribution 431. The adjustment parameters 541 provide a solution for the transition of an environment after or during unusual circumstances, e.g., a quick rebound after covid pandemic that cannot be explained by other environmental aspect.

Figure 6:
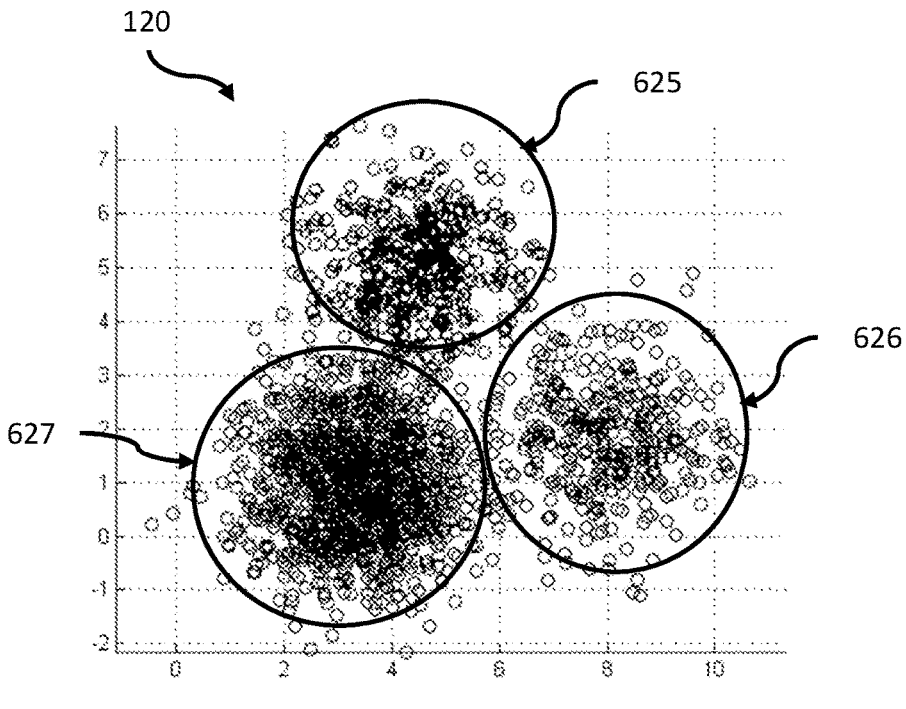
FIG. 6 shows an example of three clusters of features.

FIG. 6 shows an example of three clusters of features determined by the clustering component 120, e.g., with the GDP provided on the x-axis and a change in household savings provided on the y-axis. Cluster analysis or clustering is the task of grouping a set of objects in such a way that objects in the same group, which is called a cluster, are more similar to each other than to those in other groups. Clustering is used in many fields, including pattern recognition, image analysis, information retrieval, bioinformatics, data compression, computer graphics and machine learning.

Cluster analysis can be achieved by various algorithms that differ significantly in their understanding of what constitutes a cluster and how to efficiently find them. Popular notions of clusters include groups with small distances between cluster members, dense areas of the data space, intervals or particular statistical distributions. Clustering can therefore be formulated as a multi-objective optimization problem. The appropriate clustering algorithm and feature settings depend on the individual data set and intended use of the results. One example clustering algorithm is an unsupervised machine learning algorithm such as a k-means clustering. Thereby, each cluster has a reduced variance and plausible combination of features. The clusters may be multi-dimensional with each feature or parameter being a dimension. For determining the optimal number of clusters, different approaches can be used, e.g., elbow curve method or silhouette analysis as known in the art.

As depicted in FIG. 6, there may be one or more clusters in the data, e.g., three clusters. Each cluster represents a plausible scenario and combination of features. For example, cluster 626 may represent years of growths, cluster 625 may represent years of constant economical state and cluster 627 may represent years of recession. As can be seen in FIG. 6, the features are highly correlated within a cluster, i.e., having a high correlation coefficient. Based on the cluster, a distribution with its identifying parameters 322 can be determined for a feature. Moreover, to each cluster, i.e., to each scenario, a probability value can be associated that reflects how likely such a scenario is, e.g., how many data points were found in the cluster. Moreover, it may also be determined how likely a switch of scenario is, e.g., with which probability a scenario follows timely another scenario.

With determined clusters, the estimation error can be fundamentally reduced while needing less samples. This is shown in FIG. 7. On the x-axis, the number of samples needed for training is shown. The y-axis relates to the estimation error in a log-scale of the resource prediction machine learning model 213. Graph 724 relates to the error/sample correspondence of a resource estimation method without clustering, i.e., using one "cluster", that needs over 80,000 samples for achieving an error below 0.1. Graphs 725 and 726 each relate to the same task but presents a resource estimation method having determined two clusters. The error of the first cluster 725 is below 0.1 when having only 5,000 training samples, the error of the second cluster 726 is below 0.1 when having less than 1,000 training samples. Hence, when simulating a resource requirement for the whole environment, a method without clustering requires over 74,000 samples more than a method with clustering the data into two clusters for achieving the same error.

Figure 8:
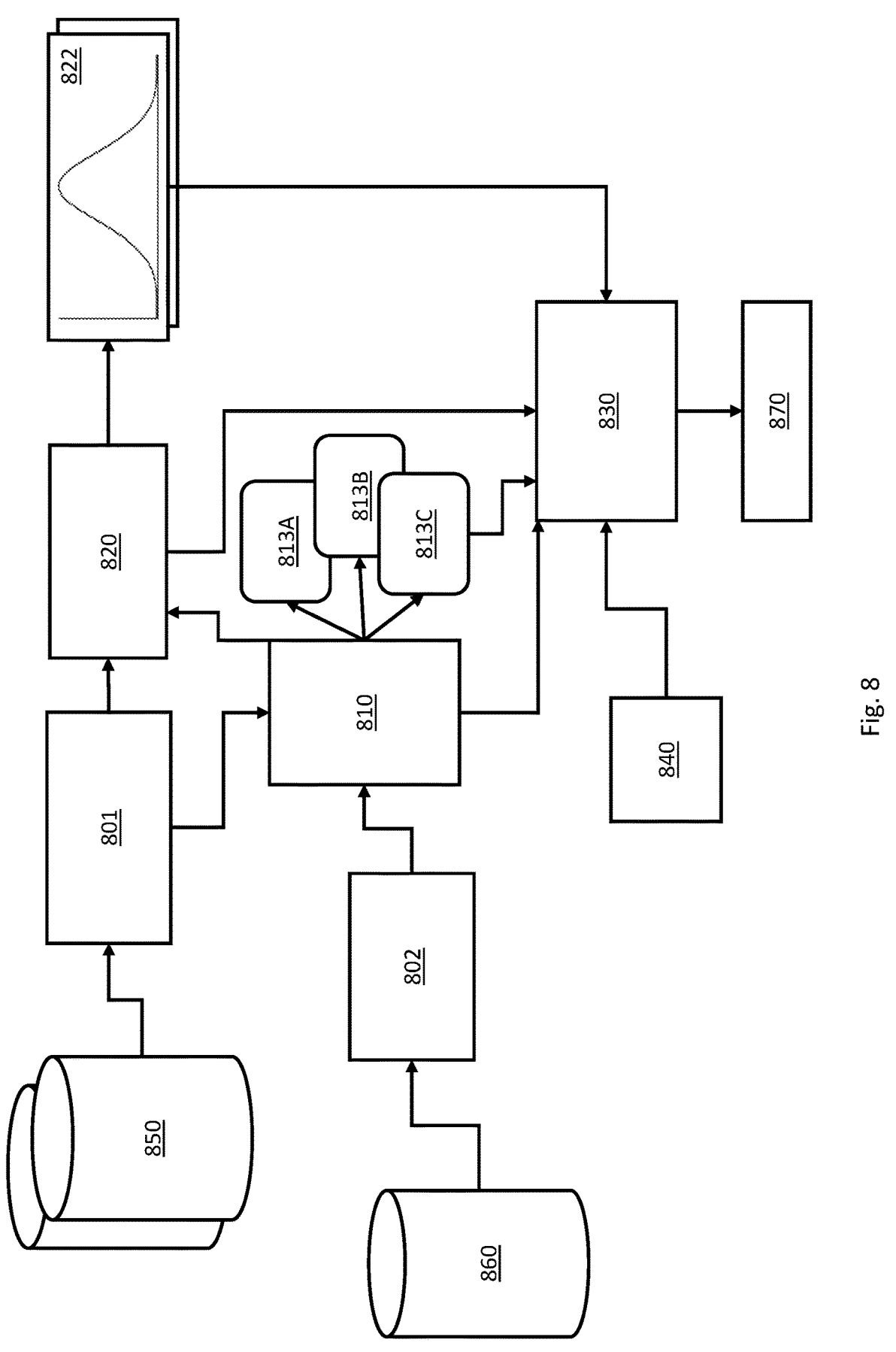
FIG. 8 is a further detailed example of estimating resource requirements according to the disclosure.

FIG. 8 is a detailed example of estimating resource requirements in an environment according to an embodiment. Similar reference numeral may refer to similar components as described before. However, other components may be present or the components may be implemented differently as known in the art.

A plurality of distributed databases may be accessed by the method of estimation resource requirements. One or more first databases 850 provide historical environment data, one or second databases 860 provide historical resource requirement data. The historical environment data comprises historical values of a time series for a plurality of features reflecting characteristics of the environment. The historical resource requirement data comprises historical values relating to a resource requirement. Both datasets are preprocessed as depicted with boxes 801 and 802. In box 801, the historical environment data is preprocessed. In box 802, the historical resource requirement data is preprocessed. Preprocessing generally comprises cleaning, aggregation, flattening, scaling, merging, or interpolation of data, or a combination of those processes.

The historical environment data and the historical resource requirement data are then provided to the machine learning training module 810. This machine learning training module trains one or more machine learning models 813A, 813B, 813C to predict a resource requirement based on the subset of features. During the training process, an automatic feature extraction is achieved. A subset of parameters from the plurality of features of the historical environment data is extracted that are the most relevant features for estimating a resource requirement. This subset of features is then provided to a clustering module 820. The clustering module 820 may also receive the original historical environment data.

The clustering module 820 determines a correlation coefficient of the features in the subset of features. Moreover, it determines clusters in this data. For each cluster, a distribution with one or more identifying parameters 822 may be determined. This finalizes the general preparation phase for setting up a simulation tool. All these steps may be performed on a high-performance computing system or a distributed server system before providing a simulation tool, e.g., implemented in a simulation module 830 to one or more clients.

The simulation module 830 uses probability distribution fitting according to the determined distribution (and the identifying parameters) 822 for each of the features of the subset of features. Therefrom, input values for the machine learning models 813A, 813B, and 813C are drawn, e.g., for an environment (such as Europe) to be simulated as described herein. With adjustment parameters provided from a user interface or another model 840, the determined distributions may be adjusted before drawing of feature values.

Finally, possibly after several rounds of drawing feature values and providing them to one or more machine learning models 813, the results 870 are provided, e.g., to a user interface illustrating the estimated development of the resource requirement with or without depicting confidence values for the estimation. Additionally or alternatively, the results 870 may be provided to another application that automatically provides the resources as estimated. The simulation tool as described herein allows a better resource management as the provision of resources can be controlled in an improved and computational efficient manner.

One aim of the simulation tool is to provide a probabilistic simulation with repeated random sampling feature values, i.e., features of the subset, by considering the fitted probabilistic distributions determined for the clusters. These sampled values are used as input to the machine learning models that, thus, provide during multiple iterations a probabilistic distribution of the estimated outcomes. One advantage over manual input of feature values is that the inputs already come from a fitted distribution, which makes them "plausible" scenarios for the future. The concepts described herein are more robust and eliminate impossible or unlikely scenarios as well as they allow to provide answers to more complex questions, such as "what is the probability that the time-series will growth less than 1%?". For such a probabilistic simulation, it is possible to define a domain of possible inputs, generate inputs randomly from a probability distribution over the domain, perform a deterministic computation on the inputs, and/or aggregate the results.

The herein presented resource estimation simulation tool generally removes the issue of providing future features by using a simulator based on fitted probability distributions. This reduces the computation needs and time (orders of magnitude) thanks to clustering strategy on input features. Moreover, it may provide confidence intervals distribution of possible resource estimations. By providing an API layer as connection point to client application, the provided solution can be used for different resource estimations and automatic model retraining with real-time resource provision and requirements can be achieved.

Figure 9:
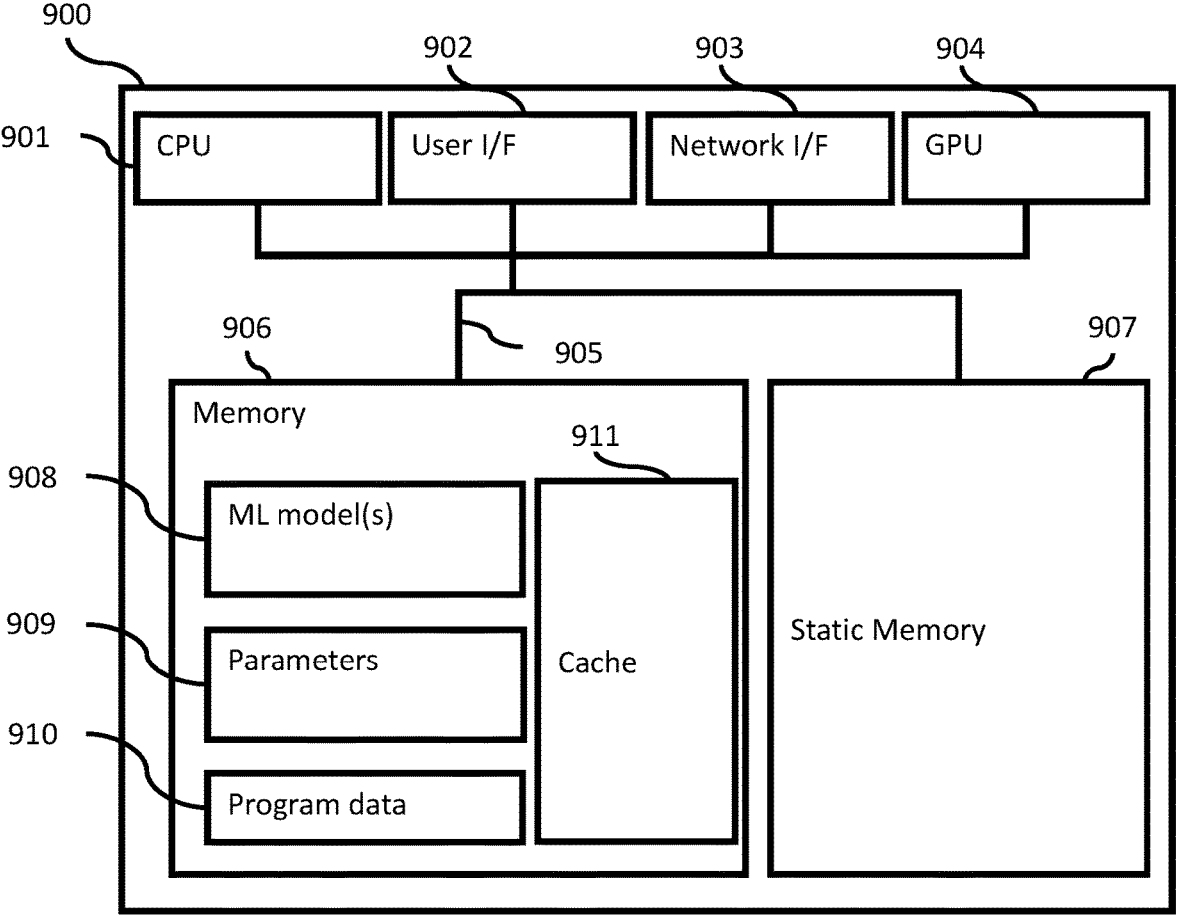
FIG. 9 shows a diagrammatic representation of a computing system implementing the functionalities described herein.

FIG. 9 is a diagrammatic representation of internal components of a computing system 900 implementing the functionality as described herein. The computing system 900 includes at least one processor 901, a user interface 902, a network interface 903 and a main memory 906, that communicate with each other via a bus 905. Optionally, the computing system 900 may further include a static memory 907 and a disk-drive unit (not shown) that also communicate with each via the bus 905. A video display, an alpha-numeric input device and a cursor control device may be provided as examples of user interface 902. Furthermore, the computing system 900 may also comprise one or more graphics processing units (GPU) 904.

The GPUs 904 may also comprise a plurality of GPU cores or streaming multiprocessors, which comprise many different components, such as at least one register, at least one cache and/or shared memory, and a plurality of ALUs, FPUs, tensor processing unit (TPU) or tensor cores, and/or other optional processing units.

The main memory 906 may be a random-access memory (RAM) and/or any further volatile memory. The main memory 906 may store program code for the training phase, the clustering phase and/or the simulation phase. In particular, the main memory 906 may store data for the machine learning models 908 as well as the features 909 required to execute the methods described herein. Other modules needed for further functionalities described herein may be stored in the memory 906, too. The memory 906 may also store additional program data 910 required for providing the functionalities described herein. Part of the program data 910, the features 909 and/or machine learning data 908 may also be stored in a separate, e.g., cloud memory and executed at least in part remotely.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the disclosure. Moreover, any of the flowcharts, sequence diagrams, and/or block diagrams may include more or fewer blocks than those illustrated consistent with embodiments of the disclosure.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated the method and while these embodiments have been described in considerable detail, it is not the intention of the applicants to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The invention claimed is:

1. A computer-implemented method of estimating resource requirements in an environment, the method comprising a preparation phase and a simulation phase, wherein the preparation phase comprises a machine learning training phase and a clustering phase, wherein the machine learning training phase comprises:

receiving historical environment data from a plurality of distributed first databases, wherein the historical environment data comprises historical values of a time series for a plurality of features reflecting characteristics of the environment;

receiving historical resource requirement data from at least one second database, wherein the historical resource requirement data comprises historical values relating to a resource requirement; and training a machine learning model to predict a resource requirement, wherein during the training phase a subset of features from the plurality of features is extracted;

wherein the clustering phase comprises:

determining at least two clusters in the historical environment data, wherein a cluster represents time periods having correlated values for features in the subset of features;

determining, for a cluster, a correlation coefficient of the features in the subset of features; and determining, for a cluster, at least one identifying parameter of a distribution of the feature values of the subset of features;

wherein the simulation phase for a cluster comprises:

determining a distribution for a feature of the subset of features according to the correlation coefficient and the at least one identifying parameter for the cluster, the feature of the subset of features correlated to a further feature of the subset of features according to the correlation coefficient;

selecting at least one value for the feature of the subset of features based on the determined distributions;

determining, for the further feature, at least one corresponding value, corresponding to the at least one value for the feature, based on the Correlation coefficient between the feature and the further feature; and inputting the at least one value for the feature of the subset of features, and the at least one corresponding value for the further feature, to the machine learning model to estimate a resource requirement in the environment in at least one time period the future;

wherein the method further comprises:

periodically updating the historical environment data and the historical resource requirement data is periodically updated with newer data to generate updated historical environment data and updated historical resource requirement data;

periodically retraining the machine learning model using the updated historical environment data and the updated historical resource requirement data as a retraining dataset to improve reliability of a later prediction of the machine learning model.

2. The method of claim 1, wherein the distribution is a normal distribution and the identifying parameters are a mean and a variance.

3. The method of claim 1, wherein the at least one identifying parameter of the distribution of the feature values of the subset of features is determined based on a maximum spacing estimation, a maximum likelihood method, or a method of moments.

4. The method of claim 1, wherein the historical environment data is preprocessed before training of the machine learning model, wherein preprocessing comprises at least one of cleaning, aggregation, flattening, scaling, and interpolation of data.

5. The method of claim 1, wherein the simulation phase further comprises adapting the distribution for the feature of the subset of features according to adjustment parameters.

6. The method of claim 5, wherein the adjustment parameters are provided via a user interface or based on a model of an unusual development of the environment.

7. The method of claim 6, wherein the unusual development of the environment is at least one of a future war, a future social unrest, a future technical development, a future pandemic, a future nature event, and a future recovery of a past sharp drop in the resource requirement.

8. The method of claim 1, wherein the historical resource requirement data is preprocessed before training of the machine learning model and before determining the at least two clusters, wherein preprocessing comprises at least one of cleaning, aggregation, merging, and interpolation of data.

9. The method of claim 1, wherein the estimated resource requirement in at least one time period in the future is provided to a client device for display and/or to a server for further processing.

10. The method of claim 1, wherein the time periods are decades, years, months, days, hours, minutes, seconds, or milliseconds.

11. The method of claim 1, wherein periods of the data update and of the machine learning model retraining are the same.

12. The method of claim 1, wherein the environment is a part of a superordinate environment, wherein the plurality of distributed first databases further comprises other historical environment data for other parts of the superordinate environment, wherein the at least one second database comprises other historical resource requirement data for the other parts of the superordinate environment, and wherein the method further comprises, in the machine learning training phase, training at least one other machine learning model for at least one of the other parts.

13. A system of estimating resource requirements in an environment configured to execute the method according to claim 1.

14. A computer program product comprising program code instructions stored on at least one non-transitory computer readable medium to execute the method steps according to claim 1, when said program code instructions are executed on a computer.

15. The method of claim 1, further comprising repeating the simulation phase for a cluster to select different values for the feature of the subset of features, and corresponding values for the further feature, until a stopping condition is reached.

16. The method of claim 15, wherein the stopping condition comprises a mean value of the estimate the resource requirement converging to a value and a variance thereof being stable.

17. The method of claim 15, wherein the different values for the feature of the subset of features are randomly selected.

18. The method of claim 15, wherein as a number of the clusters increases, a smaller sample size of the different values is reduced.

\* \* \* \* \*